(12) United States Patent
Hasesaka et al.

(10) Patent No.: US 9,930,547 B2
(45) Date of Patent: Mar. 27, 2018

(54) APPARATUS AND METHOD FOR TAKEOVER OF RELAYING COMMUNICATION BETWEEN A NETWORK AND A TERMINAL

(71) Applicant: FUJITSU LIMITED, Kawasaki-shi, Kanagawa (JP)

(72) Inventors: Kiyomi Hasesaka, Yokohama (JP); Naohisa Sada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 14/987,099

(22) Filed: Jan. 4, 2016

(65) Prior Publication Data

US 2016/0249238 A1    Aug. 25, 2016

(30) Foreign Application Priority Data

Feb. 25, 2015 (JP) ................. 2015-035317

(51) Int. Cl.
*H04W 24/04* (2009.01)
*H04W 24/02* (2009.01)
*H04W 84/04* (2009.01)

(52) U.S. Cl.
CPC .......... *H04W 24/04* (2013.01); *H04W 24/02* (2013.01); *H04W 84/047* (2013.01)

(58) Field of Classification Search
CPC ... H04W 72/085; H04W 72/08; H04W 24/04; H04B 7/15
See application file for complete search history.

(56) References Cited

U.S. PATENT DOCUMENTS

| 2003/0003874 | A1  | 1/2003 | Nitta et al. | |
|---|---|---|---|---|
| 2006/0007427 | A1* | 1/2006 | Sekiya | G02B 6/29358 |
| | | | | 356/73.1 |
| 2006/0031180 | A1* | 2/2006 | Tamarkin | G01D 4/004 |
| | | | | 705/412 |
| 2011/0092237 | A1  | 4/2011 | Kato et al. | |
| 2013/0090055 | A1* | 4/2013 | Pitakdumrongkija | H04B 7/15 |
| | | | | 455/9 |
| 2015/0094041 | A1* | 4/2015 | Jung | H04M 3/42229 |
| | | | | 455/414.1 |

FOREIGN PATENT DOCUMENTS

| JP | 2003-018073 | 1/2003 |
|---|---|---|
| JP | 2010-028369 | 2/2010 |

* cited by examiner

*Primary Examiner* — Wei Zhao
(74) *Attorney, Agent, or Firm* — Staas & Halsey LLP

(57) ABSTRACT

An apparatus is configured to detect a predetermined physical amount and relay communication between a network and a terminal. The apparatus calculates a communication disabling risk based on the predetermined physical amount, and notifies another apparatus of takeover of a process of relaying the communication between the network and the terminal when the communication disabling risk is equal to or greater than a predetermined threshold.

7 Claims, 16 Drawing Sheets

FIG. 8

| LC-ID | LATITUDE 1 | LONGITUDE 1 | LATITUDE 2 | LONGITUDE 2 |
|---|---|---|---|---|
| LC#1 | 120 | 50 | 130 | 60 |
| LC#2 | | | | |
| LC#3 | | | | |
| | | | | |

FIG. 9

| AP-ID | LC TO WHICH AP BELONGS |
|---|---|
| AP#10 | LC#2 |

FIG. 10

| PATH-ID | STATUS | N (NUMBER OF LCs THROUGH WHICH PATH EXTENDS) | HOP 1 (LC-ID, NUMBER OF BRs, BR-ID, ...) | HOP 2 (LC-ID, NUMBER OF BRs, BR-ID, ...) | | TERMINAL AP |
|---|---|---|---|---|---|---|
| PATH 1 | 0 | 7 | LC#1, 1, BR#1 | LC#2, 2, BR#2, BR#3 | | AP#2 |
| PATH 2 | 1 | 15 | LC#11, 1, BR#11 | LC#12, 2, BR#12, BR#13 | | AP#3 |
| PATH 3 | 2 | 30 | | | | AP#4 |
| FFFF | — | | | | | |

FIG. 11

| CAUSE | LEVEL | EVALUATION POINT |
|---|---|---|
| GRAVITY 1 | LESS THAN 10 G | 1 |
| GRAVITY 2 | 10 G OR HIGHER AND LESS THAN 20 G | 3 |
| GRAVITY 3 | 20 G OR HIGHER AND LESS THAN 30 G | 5 |
| GRAVITY 4 | 30 G OR HIGHER AND LESS THAN 40 G | 7 |
| GRAVITY 5 | 40 G OR HIGHER | 10 |
| VIBRATION 1 | LESS THAN 10 dB | 1 |
| VIBRATION 2 | 10 dB OR HIGHER AND LESS THAN 20 dB | 3 |
| VIBRATION 3 | 20 dB OR HIGHER AND LESS THAN 30 dB | 5 |
| VIBRATION 4 | 30 dB OR HIGHER AND LESS THAN 40 dB | 7 |
| VIBRATION 5 | 40 dB OR HIGHER | 10 |
| IMPACT 1 | LESS THAN 1 G | 1 |
| IMPACT 2 | 1 G OR MORE AND LESS THAN 10 G | 2 |
| IMPACT 3 | 10 G OR MORE AND LESS THAN 20 G | 3 |
| IMPACT 4 | 20 G OR MORE | 4 |

ACCELERATION SENSOR RISK
= GRAVITY i (i = 1 TO 10) × VIBRATION j (j = 1 TO 10) × IMPACT k (k = 1 TO 4)

FIG. 12

| | ACCELERATION SENSOR RISK THRESHOLD |
|---|---|
| VALUE | xxxxx |

FIG. 13

| LC-ID | LC DANGER LEVEL | TOPOGRAPHICAL RISK |
|---|---|---|
| LC#1 | 2.0 | 3.0 |
| LC#2 | 2.0 | 4.0 |

EXAMPLE: LC DANGER LEVEL
1.0 = MINIMUM VALUE (IN UNITS OF 1.0)
21 = MAXIMUM VALUE
EXAMPLE: TOPOGRAPHICAL RISK
1.0 = MINIMUM VALUE (IN UNITS OF 1.0)
20 = MAXIMUM VALUE

FIG. 14

| CAUSE | LEVEL | EVALUATION POINT |
|---|---|---|
| TEMPERATURE CHANGE LEVEL 1 | LESS THAN TIME AVERAGE OF 10°C | 1 |
| TEMPERATURE CHANGE LEVEL 2 | TIME AVERAGE OF 10°C OR HIGHER | 2 |
| PRECIPITATION AMOUNT 1 | 20 mm OR LARGER AND LESS THAN 30 mm | 1 |
| PRECIPITATION AMOUNT 2 | 30 mm OR LARGER AND LESS THAN 40 mm | 2 |
| SNOW ACCUMULATION 1 | LESS THAN TIME AVERAGE OF 30 cm | 1 |
| SNOW ACCUMULATION 2 | TIME AVERAGE OF 30 cm OR LARGER AND LESS THAN 50 cm | 2 |
| SNOW ACCUMULATION 3 | TIME AVERAGE OF 50 cm OR LARGER AND LESS THAN 70 cm | 3 |
| SNOW ACCUMULATION 4 | TIME AVERAGE OF 70 cm OR LARGER | 4 |
| WIND VELOCITY 1 | LESS THAN 20 m | 1 |
| WIND VELOCITY 2 | 20 m OR LARGER | 2 |
| SNOW DEPTH 1 | LESS THAN 50 cm | 1 |
| SNOW DEPTH 2 | 50 cm OR LARGER | 2 |
| SNOW ALTERNATION 1 | WEAK | 1 |
| SNOW ALTERNATION 2 | STRONG | 2 |

LC DANGER LEVEL = PRODUCT OF TEMPERATURE CHANGE LEVEL, PRECIPITATION AMOUNT, SNOW ACCUMULATION, WIND VELOCITY, SNOW DEPTH, AND SNOW ALTERNATION

FIG. 15

| CAUSE | LEVEL | EVALUATION POINT |
|---|---|---|
| INCLINATION 1 | LESS THAN 10° | 1 |
| INCLINATION 2 | 10° OR LARGER AND LESS THAN 20° | 3 |
| INCLINATION 3 | 20° OR LARGER AND LESS THAN 30° | 5 |
| INCLINATION 4 | 30° OR LARGER AND LESS THAN 40° | 7 |
| INCLINATION 5 | 40° OR LARGER | 10 |
| VEGETATION 1 | BARE AREA, GRASSLAND, TREE HEIGHT OF LESS THAN 1 | 10 |
| VEGETATION 2 | LOW TREES: DENSITY OF 20% OR HIGHER AND LESS THAN 50% | 9 |
| VEGETATION 3 | LOW TREES: DENSITY OF 50% OR HIGHER AND LESS THAN 70% | 8 |
| VEGETATION 4 | LOW TREES: DENSITY OF 70% OR HIGHER AND 100% OR LOWER | 7 |
| VEGETATION 5 | MIDDLE TREES: DENSITY OF 20% OR HIGHER AND LESS THAN 50% | 6 |
| VEGETATION 6 | MIDDLE TREES: DENSITY OF 50% OR HIGHER AND LESS THAN 70% | 5 |
| VEGETATION 7 | MIDDLE TREES: DENSITY OF 70% OR HIGHER AND 100% OR LOWER | 4 |
| VEGETATION 8 | HIGH TREES: DENSITY OF 20% OR HIGHER AND LESS THAN 50% | 3 |
| VEGETATION 9 | HIGH TREES: DENSITY OF 50% OR HIGHER | 1 |

TOPOGRAPHICAL RISK = INCLINATION $i$ ($i$ = 1 TO 5) × VEGETATION $j$ ($j$ = 1 TO 9)

APPARATUS AND METHOD FOR TAKEOVER OF RELAYING COMMUNICATION BETWEEN A NETWORK AND A TERMINAL

CROSS-REFERENCE TO RELATED APPLICATION

This application is based upon and claims the benefit of priority of the prior Japanese Patent Application No. 2015-035317, filed on Feb. 25, 2015, the entire contents of which are incorporated herein by reference.

FIELD

The embodiment discussed herein is apparatus and method for takeover of relaying communication between a network and a terminal.

BACKGROUND

For example, in an area that is a mountain area or the like and where it is difficult to install communication equipment using a wired line such as an optical line because of the topography of the area or an environment of the area, a radio communication network system is built using an access point (AP) such as a Wireless Fidelity (Wi-Fi) access point in some cases. In the radio communication network system, the AP collects and accumulates log information of a surveillance camera for security or the like and collects log information of user access for a coupon distribution service or the like.

FIG. 1 is a diagram illustrating an example of the topography of a mountain area where a radio communication network system is built. In the example illustrated in FIG. 1, the mountain area includes areas used as ski areas, predicted danger areas where the occurrence of an avalanche is predicted, a danger area in which general people are prohibited to enter, a restricted area, and the like. In the example illustrated in FIG. 1, the radio communication system is built so as to cover the ski areas.

FIG. 2 is a diagram illustrating an example of a configuration of the radio communication network system that is illustrated in FIG. 1 and is built so as to cover the ski areas. The radio communication network system includes multiple APs P1 installed at predetermined positions in the ski areas, predicted danger areas located around the ski areas, and the like and includes a monitoring operation server P2 that is located away from the ski areas at a position where the monitoring operation server P2 is not affected by an avalanche.

Each of the APs may operate as an access point that outputs a monitoring signal such as a beacon signal and is connected to a user terminal for the purpose of use in some cases. Each of the APs may operate as a bridge that relays radio communication between access points without transmitting a monitoring signal in some cases. In FIG. 2, each of APs that operate as bridges is indicated by "BR" (bridge). Hereinafter, when an access point operates as an access point, the access point is indicated by "AP". Hereinafter, an access point that serves as a device is indicated as a radio relay device.

The monitoring operation server P2 monitors the radio relay devices P1, executes a process of detecting a failure, receives an avalanche alert message from an avalanche prediction system P3, and notifies the radio relay devices P1 included in the radio communication network system of the avalanche alert message. The avalanche prediction system P3 is a system for predicting the occurrence of an avalanche based on topography, weather, the state of accumulated snow, and the like. The monitoring operation system P2 connects the radio communication network system to the Internet.

Examples of related art are Japanese Laid-open Patent Publications Nos. 2010-28369 and 2003-18073.

SUMMARY

According to an aspect of the invention, an apparatus is configured to detect a predetermined physical amount and relay communication between a network and a terminal. The apparatus calculates a communication disabling risk based on the predetermined physical amount, and notifies another apparatus of takeover of a process of relaying the communication between the network and the terminal when the communication disabling risk is equal to or greater than a predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a positional information/LC management table held by a positional information/LC management DB, according to an embodiment;

FIG. 9 illustrates an example of an AP-LC management table held by an AP-LC management DB, according to an embodiment;

FIG. 10 illustrates an example of an AP/BR path management table held by an AP/BR path management DB, according to an embodiment;

FIG. 11 illustrates an example of an acceleration sensor risk management table held by an acceleration sensor risk management DB, according to an embodiment;

FIG. 12 illustrates an example of an acceleration sensor risk threshold management table held by an acceleration sensor risk threshold management DB, according to an embodiment;

FIG. 13 illustrates an example of a topographical information management table held by a topographical information management DB, according to an embodiment;

FIG. 14 illustrates an example of an LC risk level cause table, according to an embodiment;

FIG. 15 illustrates an example of a topographical risk cause table, according to an embodiment;

DESCRIPTION OF EMBODIMENT

Figure 2:
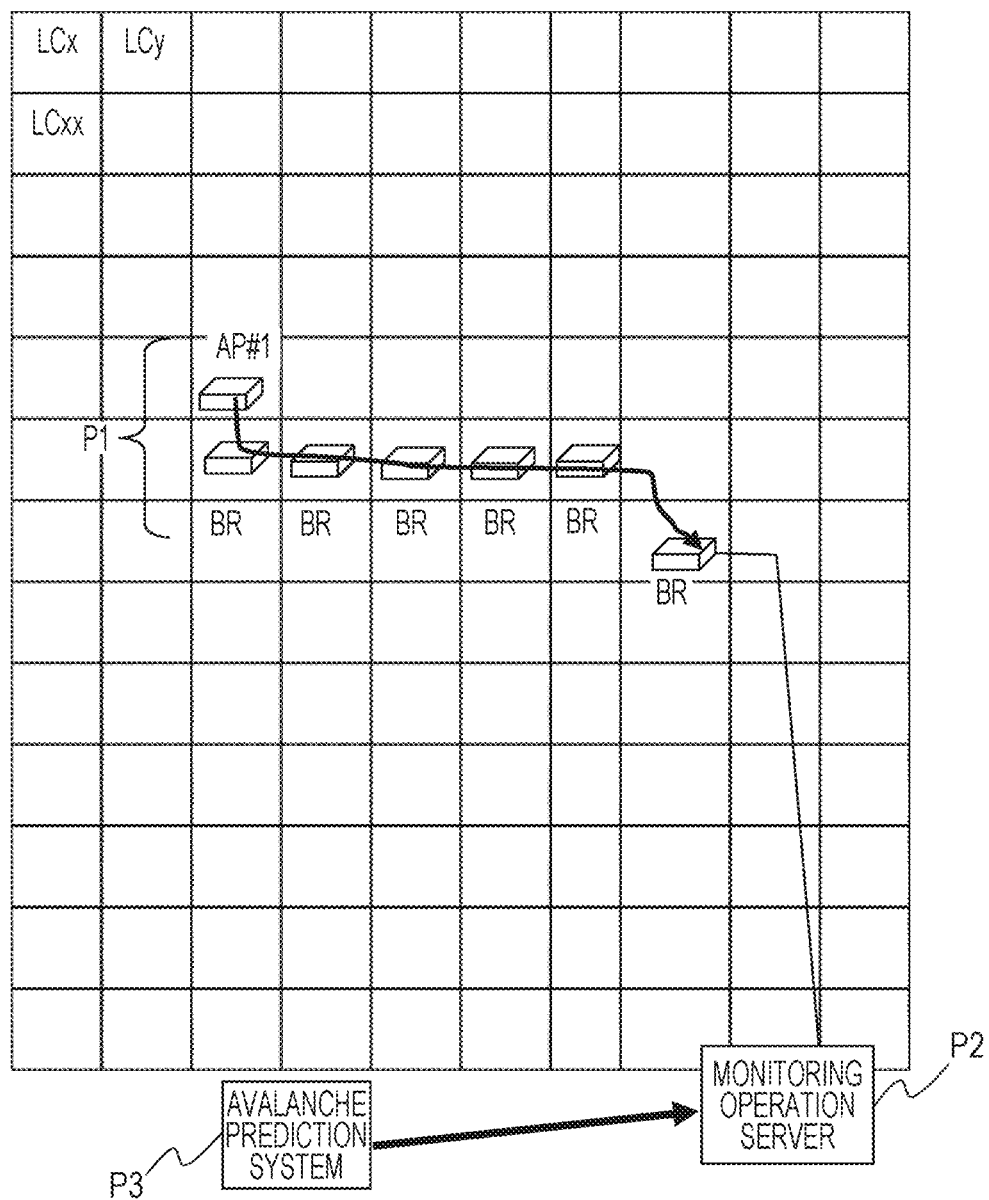
FIG. 2 is a diagram illustrating an example of a configuration of the radio communication network system that is illustrated in FIG. 1 and is built so as to cover ski areas.

When an avalanche as an example of a natural disaster occurs, an AP #1 included in the radio communication network system illustrated in FIG. 2 may be struck by the avalanche. Even if a BR normally operates when the AP #1 is struck by the avalanche and becomes inoperable, the AP #1 stops operating, a terminal becomes unable to be connected to a network, and radio communication becomes disconnected.

Hereinafter, an embodiment is described with reference to the accompanying drawings. Configurations described in the embodiment are examples, and the embodiment is not limited to the configurations.

Embodiment

A radio communication network system according to the embodiment includes an AP, a plurality of BRs, a monitoring operation server, and an avalanche prediction system, similarly to the radio communication network system illustrated in FIG. 2. The embodiment assumes that the radio communication network system forms a Wi-Fi network.

If an avalanche occurs and the AP and the BRs are struck by the avalanche, it is predicted that the AP and the BRs are affected by the avalanche in the following three cases.

(1) The AP and the BRs move without changing relative positional relationships between the AP and the BRs.

(2) Communication of a part of the BRs becomes disabled.

(3) Communication of the AP becomes disabled.

In each of the cases, the AP and the BRs execute the following processes in the embodiment. Each of the AP and the BRs includes an acceleration sensor and periodically monitors gravity, vibration, impact, and the like and monitors whether or not the device is moving. When each of the AP and the BRs detects a movement of the device, the device increases a radio field intensity of a radio signal so as to increase a footprint and confirms communication between the AP and a BR adjacent to the AP or communication between the BR and a BR adjacent to the BR.

When the AP detects a movement of the AP, the AP executes the aforementioned processes, confirms communication between the AP and the monitoring operation server 2, and determines a risk that the communication of the AP becomes disabled at a destination of the AP. The risk that the communication of the AP becomes disabled depends on the topography of the destination such as a location in which there are many cliffs or trees, the state of accumulated snow at the destination, and the like. When the AP determines that the communication of the AP is likely to become disabled at the destination, the AP causes a BR located in a safe region to take over a role of the AP.

Figure 3:
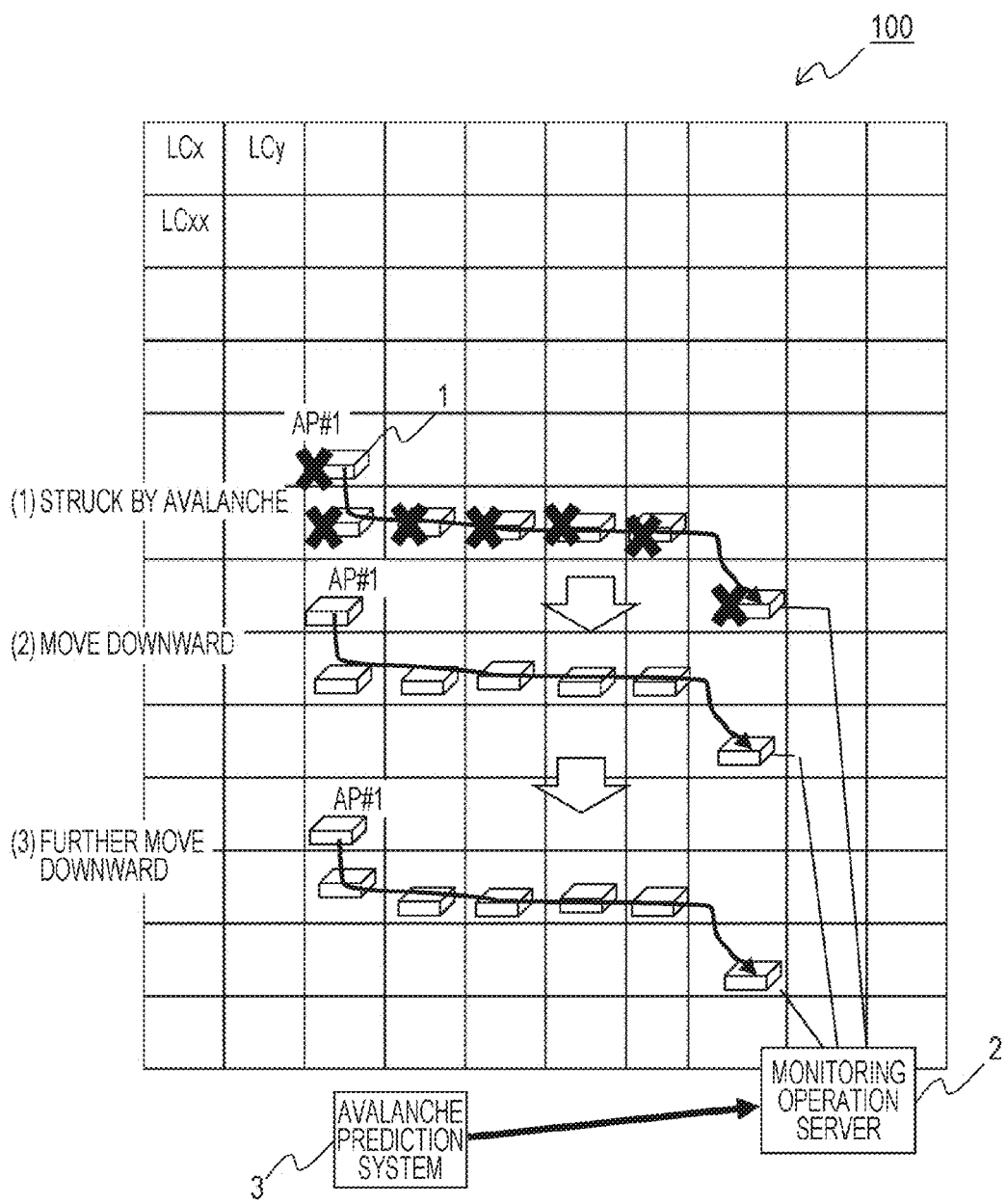
FIG. 3 is a diagram describing a process to be executed when an AP #1 and BRs move due to the occurrence of an avalanche without changing relative positional relationships between the AP #1 and the BRs, according to an embodiment.

FIG. 3 is a diagram illustrating an example of a process to be executed when the AP and the BRs move due to the occurrence of an avalanche without changing the relative positional relationships between the AP and the BRs. The radio communication network system 100 according to the embodiment includes a plurality of radio relay devices 1 installed in a ski area or the like and configured to form a Wi-Fi network, the monitoring operation server 2, and the avalanche prediction system 3, for example. The radio relay devices 1 include the AP and the plurality of BRs and form a path from the AP to the monitoring operation server 2.

When (1) an avalanche occurs and (2) the AP and the BRs move down a mountain due to the avalanche, the AP and the BRs detect the movements of the devices, increase radio field intensities of radio signals, and conform communication between the devices and adjacent radio relay devices 1 and communication between the AP and the monitoring operation server 2. Since FIG. 3 assumes that the AP and the BRs move without changing the relative positional relationships between the AP and the BRs, communication between the AP and the BRs is ensured and radio communication and communication services are continued.

(3) After that, even if the AP and the BRs further move downward, the same processes are repeated. When the communication of the AP and BRs does not become disabled, the radio communication and the communication services are continued.

At the time of (2), the AP determines a risk that the communication of the AP becomes disabled. In FIG. 3, the risk that the communication of the AP becomes disabled is low and the AP continuously plays the role of the AP.

Figure 4:
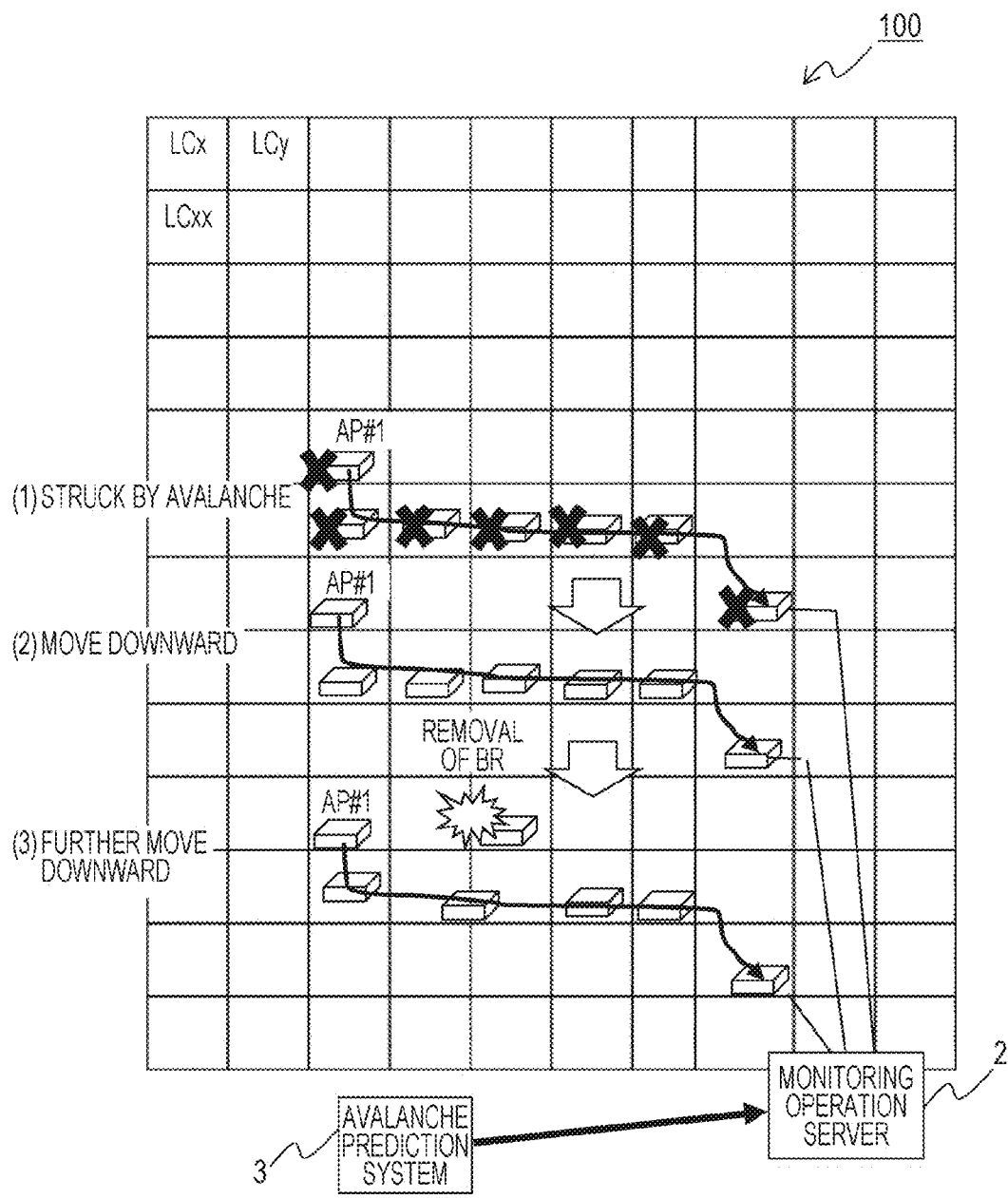
FIG. 4 is a diagram describing an example of a process to be executed when communication of a part of BRs becomes disabled due to the occurrence of an avalanche, according to an embodiment.

FIG. 4 is a diagram illustrating an example of a process to be executed when communication of a part of the BRs becomes disabled. When (1) an avalanche occurs and (2) the AP and the BRs move down the mountain due to the avalanche, the AP and the BRs detect the movements of the devices, increase the radio field intensities of radio signals, and confirm the communication between the devices and the adjacent radio relay devices 1 and the communication between the AP and the monitoring operation server 2. At this time, the communication of the AP and BRs does not become disabled and is continuously executed.

(3) After that, the AP and the BRs further move downward, and when communication of a single BR becomes disabled during the movements, a BR that is adjacent to the BR whose communication became disabled further increases the radio field intensity and tries to be connected to another BR. When the radio field intensity is increased, a footprint is widened. The BR that is adjacent to the BR whose communication became disabled may detect a new Adjacent BR or the AP and continue radio communication. At the time of (2), the AP determines the risk that the communication of the AP becomes disabled. In the example illustrated in FIG. 4, however, the risk that the communication of the AP becomes disabled is low and the AP continuously plays the role of the AP.

Figure 5:
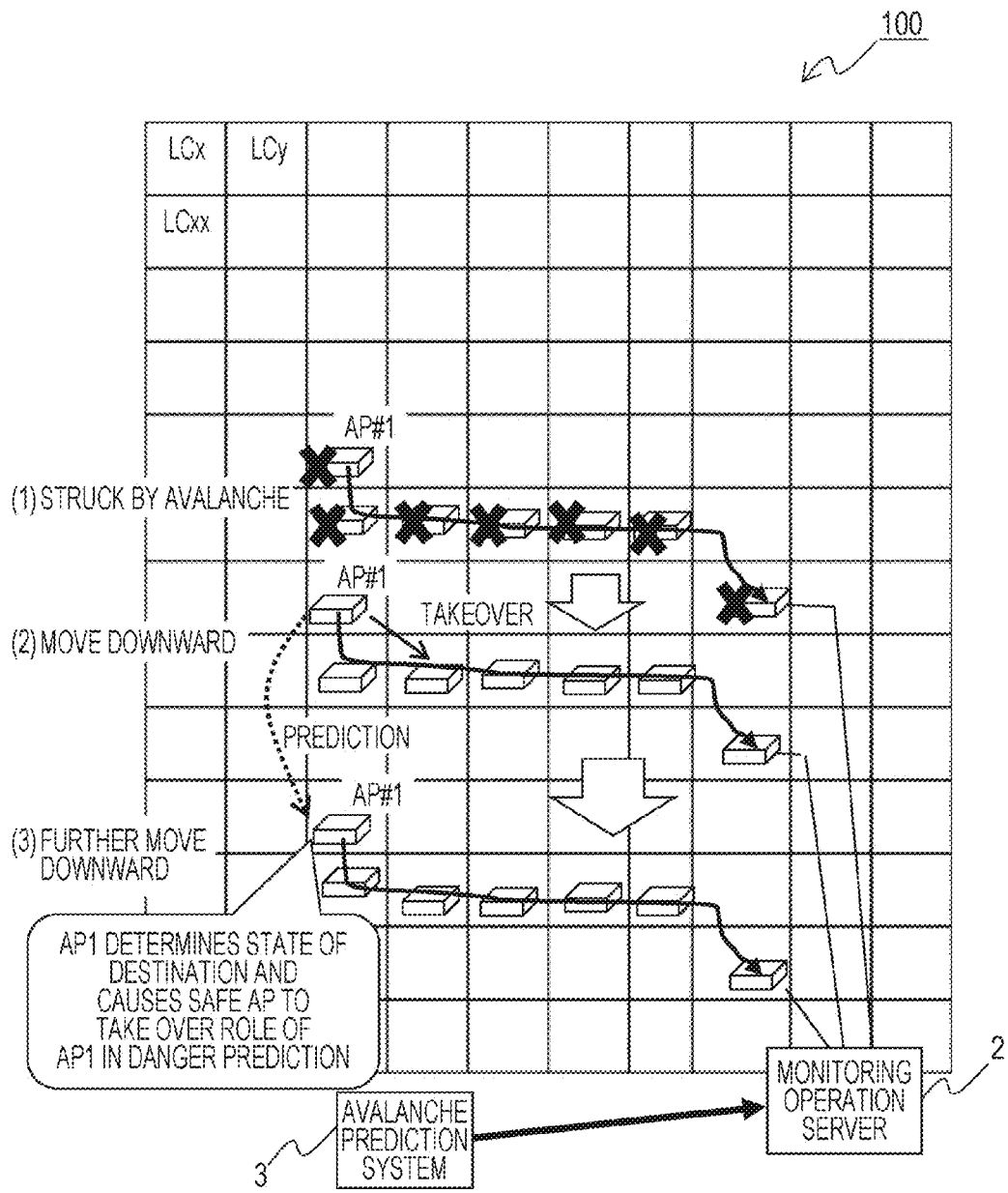
FIG. 5 is a diagram describing an example of a process to be executed when communication of the AP #1 becomes disabled due to the occurrence of an avalanche, according to an embodiment.

FIG. 5 is a diagram illustrating an example of a process to be executed when the communication of the AP becomes disabled due to the occurrence of an avalanche. When (1) the avalanche occurs and (2) the AP and the BRs move down the mountain due to the avalanche, the AP and the BRs detect the movements of the devices, increase the radio field intensities, and confirm the communication between the devices and the adjacent radio relay devices 1 and the communication between the AP and the monitoring operation server. At this time, the communication of the AP and BRs does not become disabled and is continuously executed.

(3) After that, the AP and the BRs further move downward and the communication of the AP becomes disabled at the destination. In the example illustrated in FIG. 5, at the time of (2), the AP determines that the communication of the AP is likely to become disabled, and the AP causes a BR located in a safe region to take over the role of the AP. Thus, at the time of (3), even if the communication of the AP is disabled, the radio communication and the communication services are continued by the BR that took over the role of the AP.

Configurations of Devices

Figure 6:
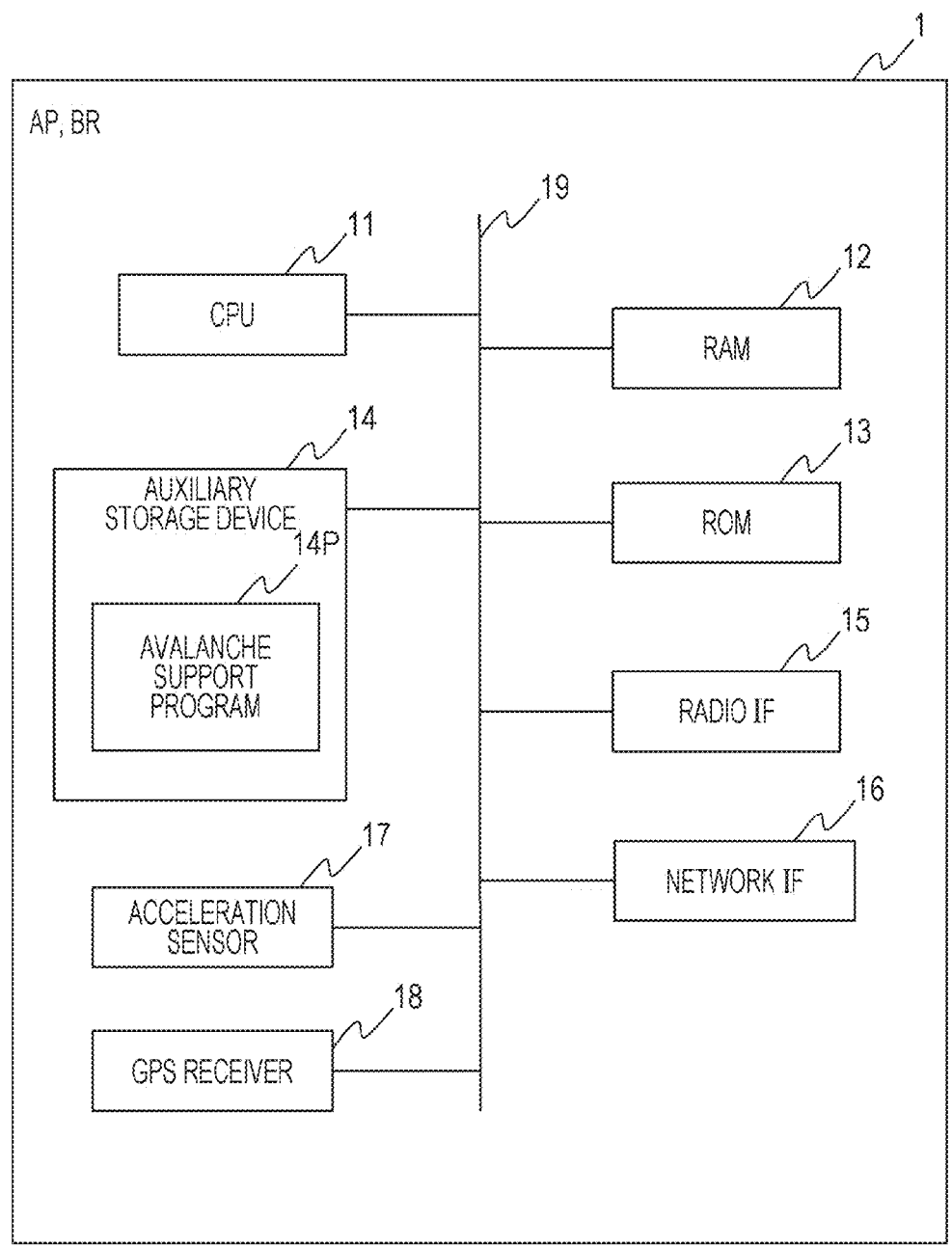
FIG. 6 is a diagram illustrating a hardware configuration of a radio relay device, according to an embodiment.

FIG. 6 is a diagram illustrating an example of a hardware configuration of each radio relay device 1. The radio relay devices 1 are, for example, access points, small radio stations, or the like. Each of the radio relay devices 1 is an example of a "radio communication device". The radio relay devices 1 each include a central processing unit (CPU) 11, a random access memory (RAM) 12, a read only memory (ROM) 13, an auxiliary storage device 14, a radio interface 15, a network interface 16, an acceleration sensor 17, and a GPS receiver 18 that are electrically connected to each other by a bus 19.

The CPU 11 loads, into the RAM 12, an OS and various application programs held by the ROM 13 or auxiliary storage device 14, executes the OS and the application programs, and thereby executes various processes. The number of CPUs 11 included in each radio relay device 1 is not limited to 1 and may be two or more.

The RAM 12 is a volatile storage medium that is used as a buffer and provides, to the CPU 11, a storage region and work region into which the programs stored in the ROM 13 or auxiliary storage device 14 are loaded. The RAM 12 is a semiconductor memory such as a dynamic RAM (DRAM), a static RAM (SRAM), or a synchronous DRAM (SDRAM). The ROM 13 is a nonvolatile storage medium holding programs such as a basic input/output system (BIOS).

The auxiliary storage medium 14 stores various programs and data that is used by the CPU 11 for the execution of the programs. The auxiliary storage device 14 is an erasable programmable ROM (EPROM) or a nonvolatile storage medium such as a hard disk drive, for example. The auxiliary storage device 14 holds the operating system (OS), an avalanche support program 14P, and other various application programs, for example. The avalanche support program 14P is a program to be used to execute a process in order to continue communication when a movement, caused by an avalanche, of the radio relay device 1 is detected.

The radio interface 15 is a Wi-Fi radio communication circuit in the embodiment. When the radio communication network system forms a 3G Long Term Evaluation (LTE) network, the radio interface 15 is a 3G LTE radio communication circuit. The radio relay device 1 is connected to the other radio relay devices 1 and user terminals through the radio interface 15. The network interface 16 is a circuit that connects the radio relay device 1 to a wired network cable such as an optical cable or a local area network (LAN) cable, for example. The radio relay device 1 is connected to the monitoring operation server 2 through the network interface 16, for example. Thus, if the radio relay device 1 is not connected to the monitoring operation server 2, the network interface 16 may be omitted.

Figure 1:
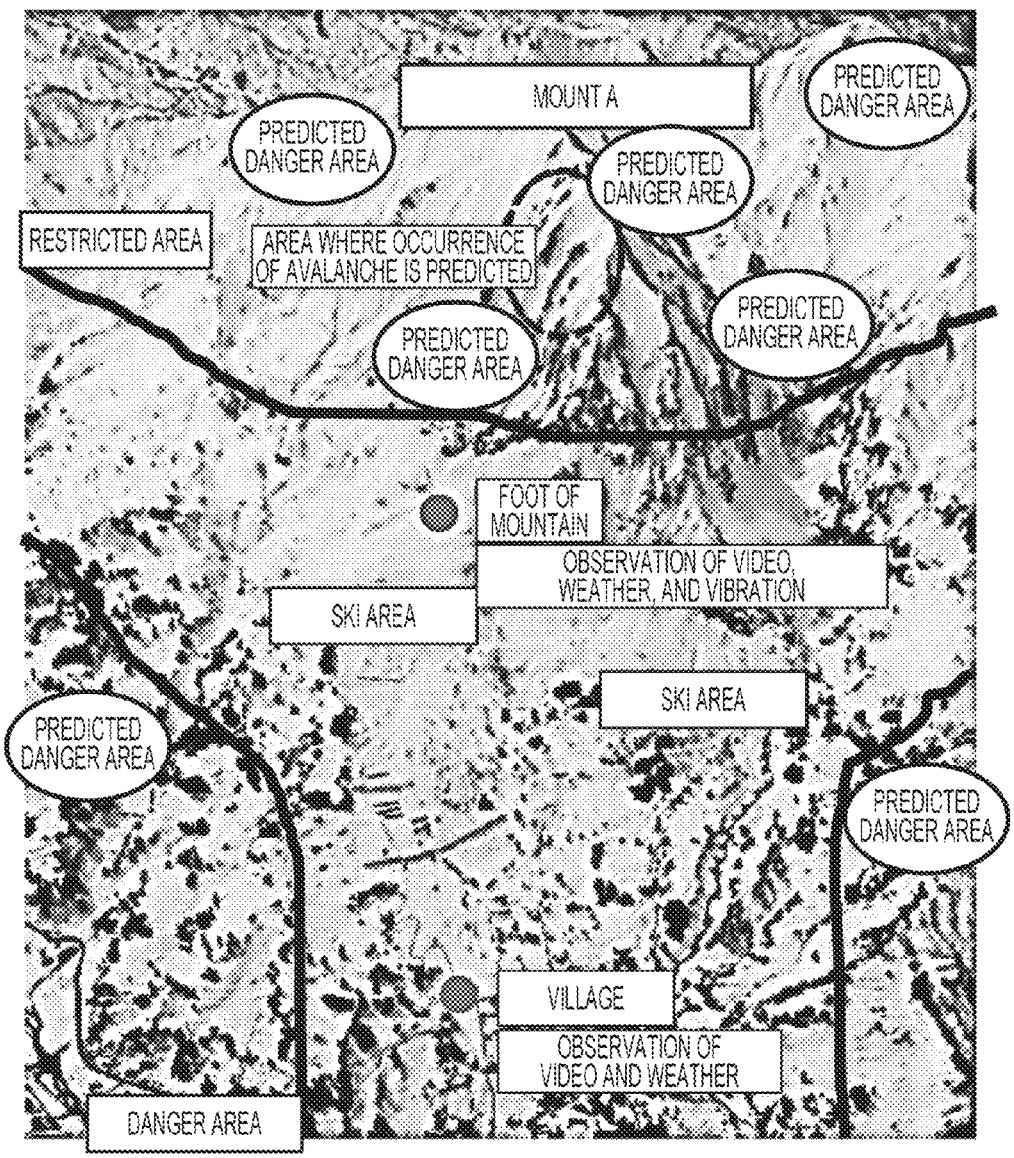
FIG. 1 is a diagram illustrating an example of the topography of a mountain area where a radio communication network system is built.

The hardware configuration of the radio relay device 1 that is illustrated in FIG. 1 is an example. The hardware configuration of the radio relay device 1 is not limited to the configuration illustrated in FIG. 6. The constituent elements of the radio relay device 1 may be omitted and replaced with other elements, and another element may be added to the radio relay device 1 in the embodiment. For example, the radio relay device 1 may include a portable recording medium driving device, and a portable recording medium such as an SD card may be used as the auxiliary storage device. In addition, the radio relay device 1 may be connected to a surveillance camera and collect and accumulate video images acquired by the camera.

Figure 7:
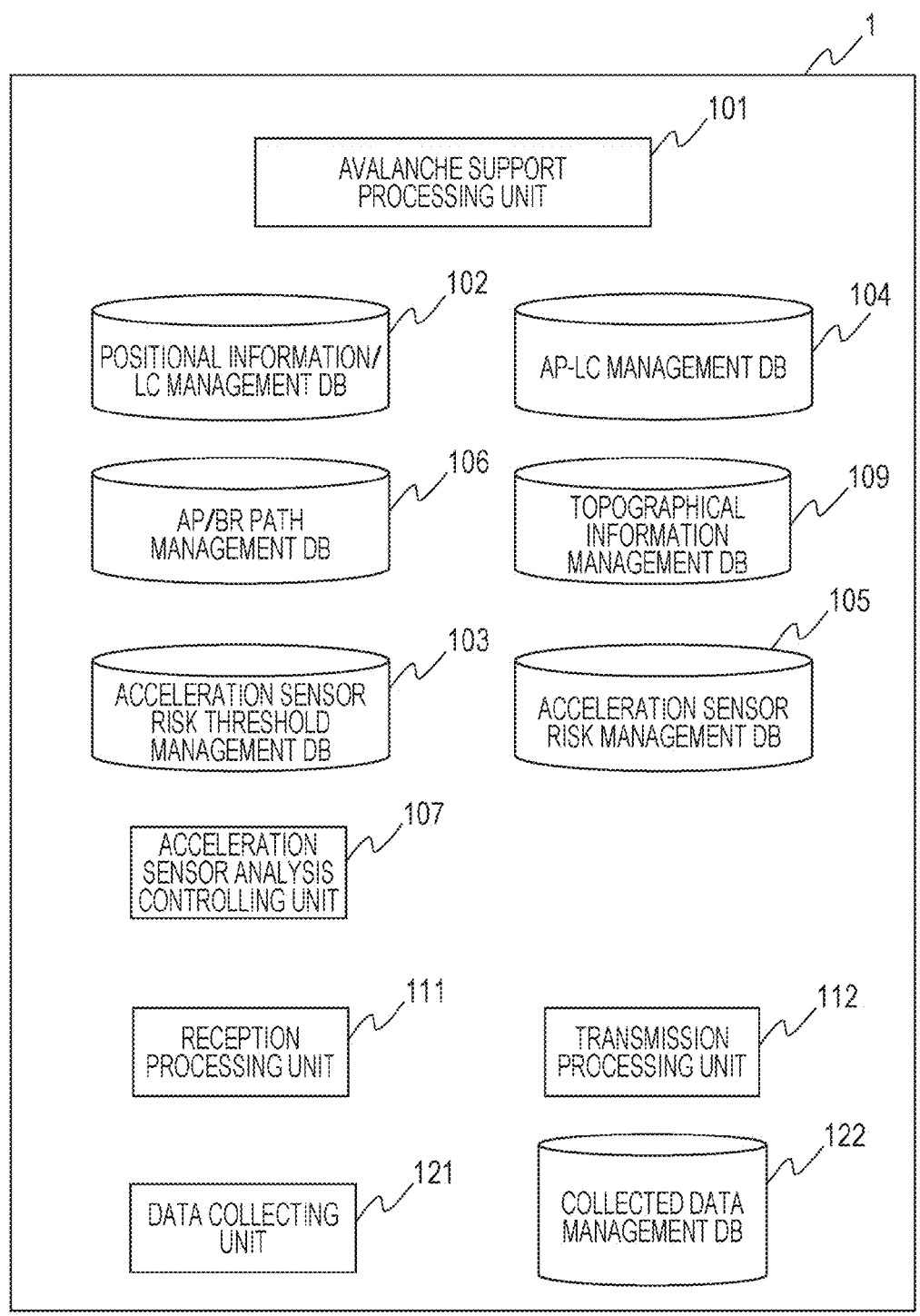
FIG. 7 is a diagram illustrating a functional configuration of the radio relay device, according to an embodiment.

FIG. 7 is a diagram illustrating an example of a functional configuration of each radio relay device 1. The radio relay device 1 includes, as functional elements, an avalanche support processing unit 101, a positional information/LC management database (hereinafter referred to as DB) 102, an acceleration sensor risk threshold management DB 103, an AP-LC management DB 104, an acceleration sensor risk management DB 105, an AP/BR path management DB 106, an acceleration sensor analysis controlling unit 107, a topographical information management DB 109, a reception processing unit 111, a transmission processing unit 112, a data collecting unit 121, and a collected data management DB 122.

The data collecting unit 121 is a functional element achieved by causing the CPU 11 to execute a data collection program stored in the auxiliary storage device 14. The collected data management DB 122 is generated and stored in a storage region of the auxiliary storage device 14 by the installation or execution of the data collection program. The collected data management DB 122 uses a part of a storage region of the RAM 12. The storage region of the RAM 12 that is used by the collected data management DB 122 is a region for holding collected data before the collected data are stored in the storage region of the auxiliary storage device 14.

The data collecting unit 121 causes a user access log and data collected by a sensor such as a surveillance camera, to be stored in the collected data management DB 122. In addition, the data collecting unit 121 transmits data stored in the collected data management DB 122 to the monitoring operation server 2 at predetermined intervals, for example. The transmitted data may be deleted from the collected data management DB 122. In the embodiment, the data collecting unit 121 is activated when the radio relay device 1 operates as an AP, while the data collecting unit 121 is not activated when the radio relay device 1 operates as a BR.

A user access log, video image data acquired by the surveillance camera, data acquired by the sensor, and the like are stored in the collected data management DB 122, for example.

The acceleration sensor analysis controlling unit 107 is a driver for the acceleration sensor 17. The acceleration sensor analysis controlling unit 107 acquires physical amounts, such as gravity, vibration, and impact, from detected values input from the acceleration sensor 17 at predetermined intervals, for example. For example, when the acceleration sensor 17 is a sensor for detecting capacitance, the amount of a change in capacitance is input as a detected value from the acceleration sensor 17 to the acceleration sensor analysis controlling unit 107. Intervals at which the acceleration sensor 17 executes measurement are in the order of microseconds. The acceleration sensor analysis controlling unit 107 outputs the acquired values of gravity, vibration, impact, and the like to the avalanche support processing unit 101. The values of gravity, vibration, impact, and the like that are acquired by the acceleration sensor analysis controlling unit 107 from the values detected by the acceleration sensor 17 are hereinafter referred to as "values detected by the acceleration sensor 17" for convenience sake.

The avalanche support processing unit 101 is one of functional elements achieved by causing the CPU 11 to execute the avalanche support program 14P. The positional information/LC management DB 102, the acceleration sensor risk threshold management DB 103, the AP-LC management DB 104, the acceleration sensor risk management DB 105, the AR/BR path management DB 106, and the topographical information management DB 109 are generated in a storage region of the auxiliary storage device 14 by the installation or execution of the avalanche support program 14P. At least a part of the processing units of the radio relay device 1 exemplified in FIG. 7 may be a hardware circuit.

The avalanche support processing unit 101 determines, based on the values detected by the acceleration sensor 17 and positional information, whether or not the radio relay device 1 is struck by an avalanche. In the embodiment, whether or not the radio relay device 1 is struck by the avalanche is determined based on whether or not the radio relay device 1 is moving. The positional information is input to the avalanche support processing unit 101 from the GPS receiver 18 at predetermined intervals, for example. The intervals at which the positional information is acquired from the GPS receiver 18 are in the order of milliseconds. The GPS receiver 18 is an example of a "positional information acquiring unit".

A process that is executed by the avalanche support processing unit 101 when the radio relay device 1 operates as an AP is as follows. When determining that the radio relay device 1 is struck by an avalanche, the avalanche support processing unit 101 calculates communication disabling risks that each indicate a probability at which communication of the radio relay device 1 becomes disabled. The communication disabling risks include an acceleration sensor risk indicating a probability at which the radio relay device 1 falls and that is calculated based on the physical amounts received from the acceleration sensor analysis controlling unit 107. In addition, the communication disabling risks include a destination risk indicating a probability at which the radio relay device 1 falls and that is calculated based on a topographical risk and LC danger level of a destination.

When the communication disabling risks are equal to or greater than a predetermined threshold, the avalanche support processing unit 101 determines that communication of the radio relay device 1 is likely to become disabled, and the avalanche support processing unit 101 transmits a notification to a BR located in a safe region in order to cause the BR to take over a role of the AP. The notification is transmitted through the transmission processing unit 112. In this case, the avalanche support processing unit 101 reads data stored in the collected data management DB 122 and transmits the notification and the data to the BR. Details of the processes executed by the avalanche support processing unit 101 are described later.

A process that is executed by the avalanche support processing unit 101 when the radio relay device 1 operates as a BR is as follows. When receiving, from the AP, a notification instructing the radio relay device 1 to operate as the AP, the avalanche support processing unit 101 changes an operational mode of the radio relay device 1 from the AP to the BR and activates the data collecting unit 121.

Each of the reception processing unit 111 and the transmission processing unit 112 is one of functions of the OS and is an interface with applications such as the avalanche support program 14P, middleware, and the OS. For example, the reception processing unit 111 receives data that are obtained by causing the OS to convert an electric signal into which a radio wave received by the radio interface 15 is converted, and the reception processing unit 111 outputs the data to the avalanche support processing unit 101.

For example, the transmission processing unit 112 transmits, to the monitoring operation server 2, data stored in the collected data management DB 122 and read by the avalanche support processing unit 101 that has determined that a risk that communication of the radio relay device 1 becomes disabled is high. The data transmitted by the transmission processing unit 112 is converted into an electric signal by the OS, the electric signal is converted into a radio wave by the radio interface 15, and the radio wave is transmitted by the radio interface 15, for example.

Next, information stored in the databases is described. In the embodiment, the databases hold the information as tables. The configurations of the tables stored in the databases described below are examples and are not limited to configurations described below.

FIG. 8 illustrates an example of a positional information/LC management table held by the positional information/LC management DB 102. The positional information/LC management table stores information of LCs that exist in the radio communication network system 100. The LCs (locations) are blocks into which a communication range covered by the radio communication network system 100 is divided. In the embodiment, the shapes of the LCs are rectangles. Identification numbers are provided to the LCs. The shapes of the LCs are not limited to rectangles and may be arbitrary shapes based on the shape of a region in which the radio communication network system 1 is built as long as the LCs do not overlap each other. The sizes of the LCs may be the same as each other or different from each other and are not limited.

In the positional information/LC management table, identification information (LC-IDs) of the LCs within the radio communication network system 100 and information of the longitudes and latitudes of the LCs are associated with each other and stored. Since the embodiment assumes that the shapes of the LCs are rectangles, it is sufficient to store latitudes and longitudes indicating two end points of a diagonal of each of the rectangles or the LCs. Specifically, a pair of values that include a smaller latitude among two pairs of values indicating latitudes and longitudes of two end points of a diagonal of a rectangle or an LC are stored in latitude 1 and longitude 1, for example. In addition, a pair of values that include a larger latitude among two pairs of values indicating latitudes and longitudes of the two end points of the diagonal of the rectangle or the LC are stored in latitude 2 and longitude 2, for example.

Positional information/LC management tables, which are included in all the radio relay devices 1 within the radio communication network system 100, hold the same details. The positional information/LC management tables are built in advance by an administrator of the radio communication network system 100, input directly to the radio relay devices 1 or input to the radio relay devices 1 through the monitoring operation server 2, and held by the radio relay devices 1, for example. When the arrangement of the LCs is changed in the radio communication network system 100, the positional information/LC management tables are updated by the administrator.

FIG. 9 illustrates an example of an AP-CL management table held by the AP-LC management DB 104. The AP-LC management table holds information indicating an LC in which the radio relay device 1 exists. The AP-LC management table is set by the administrator in advance. When the arrangement of the radio relay device 1 is changed, a value that indicates an LC in which the radio relay device 1 exists is input to the radio relay device 1 through the monitoring operation server 2 or input directly to the radio relay device 1 and thereby updated, for example.

In the embodiment, in the AP-LC management table, identification information (AP-ID) of the target radio relay device 1 and identification information of the LC to which the target radio relay device 1 belongs are associated with each other and stored.

FIG. 10 illustrates an example of an AP/BR path management table held by the AP/BR path management DB 106. The AP/BR path management table is a table holding information of all paths from the target radio relay device 1 to a destination. In the embodiment, all paths from the target radio relay device 1 to the monitoring operation server 2 are held in the AP/BR path management table. For example, the paths to the destination may be statically set and input by the system administrator or may be dynamically calculated by a routing protocol of radio communication. AP/BR path management tables are built and held by the radio relay devices 1. When a path is changed, an AP/BR path management table that holds information of the path is updated.

In the AP/BR path management table illustrated in FIG. 10, for each of the paths, identification information (path-ID) of the path, the status of the path, the number (N) of LCs through which the path extends, information (hops X) on the LCs on the path, and the ID (terminal AP) of a radio relay device 1 that is a terminal of radio communication are associated with each other and stored. For example, when the status of the path indicates 0, the status indicates that the path is an operating path. When the value of the status is not 0, the status indicates that the path is a preliminary path. For example, the value of the status may be set to ensure that the smaller the status, the higher a priority at which the path is selected as an operating path.

The information on the LCs on the path includes the IDs of the LCs, the number of radio relay devices 1 existing in each of the LCs, and the IDs of radio relay devices 1 existing in each of the LCs, for example. In the embodiment, when a radio relay device 1 operates as the AP, AP#X is indicated as the ID of the radio relay device 1 in the AP/BR path management table. When the radio relay device 1 operates as a BR, BR#X is indicated as the ID of the radio relay device 1 in the AP/BR path management table.

FIG. 11 illustrates an example of an acceleration sensor risk management table held by the acceleration sensor risk management DB 105. In the acceleration sensor risk management table, causes of a risk that the target radio relay device 1 falls, and evaluation points for levels of the cause, are stored. In the embodiment, as the causes of the risk that the target radio relay device 1 falls, gravity, vibration, and impact are used. The causes of the risk that the target radio relay device 1 falls, however, are not limited to them.

The gravity is pressure detected by the acceleration sensor 17 and continuously applied to the radio relay device 1. The unit of the gravity is G. The vibration is vibration of the radio relay device 1 and detected by the acceleration sensor 17. The unit of the vibration is dB. The impact is pressure detected by the acceleration sensor 17 and applied to the radio relay device 1 for a predetermined time period. The unit of the impact is G. A period of time for measuring the impact is significantly shorter than a period of time for measuring the gravity.

The levels of the causes and the evaluation points for the levels of the causes are set by the administrator of the radio communication network system 100. The levels of the causes and the evaluation points for the levels of the causes are not limited to those illustrated in FIG. 11.

In the embodiment, the acceleration sensor risk is calculated by multiplying the evaluation points of the gravity, vibration, and impact. Specifically, the avalanche support processing unit 101 acquires the detected values of the gravity, vibration, and impact from the acceleration sensor analysis controlling unit 107, acquires the evaluation points of the gravity, vibration, and impact from the acceleration sensor risk management table, and calculates the acceleration sensor risk by multiplying the evaluation points. The method of calculating the acceleration sensor risk, however, is not limited to this.

FIG. 12 illustrates an example of an acceleration sensor risk threshold management table held by the acceleration sensor risk threshold management DB 103. In the acceleration sensor risk threshold management table, an acceleration sensor risk threshold that is used to determine whether or not the radio relay device 1 falls is stored. Acceleration sensor risk threshold management tables are held by the radio relay devices 1. The acceleration sensor risk threshold management tables are set by the system administrator. The acceleration sensor risk threshold management tables are updated when the acceleration sensor risk threshold is changed.

FIG. 13 illustrates an example of a topographical information management table held by the topographical information management DB 109. In the topographical information management table, information of all the LCs within the radio communication network system 100 is stored. The information stored in the topographical information management table indicates probabilities at which an avalanche occurs or at which the LCs are affected by the occurrence of an avalanche and that are calculated based on static causes of the occurrence of an avalanche and causes of the occurrence of an avalanche that dynamically change. The information that indicates the probabilities at which an avalanche occurs or at which the LCs are affected by the occurrence of an avalanche and that are calculated based on the causes of the occurrence of an avalanche that dynamically change is hereinafter referred to as LC danger levels. The information that indicates the probabilities at which an avalanche occurs or at which the LCs are affected by the occurrence of an avalanche and that are calculated based on the static causes of the occurrence of an avalanche is hereinafter referred to as topographical risks.

In the embodiment, the LC danger levels and the topographical risks are used to determine destination risks that indicate probabilities at which communication of the target radio relay device 1 becomes disabled due to falling of the radio relay device 1 when the radio relay device 1 moves to the LCs. The larger the LC danger levels and the topographical risks, the higher danger levels indicated by the LC danger levels and the topographical risks. In the embodiment, the LC danger levels and the topographical risks are calculated by the monitoring operation server 2 at predetermined intervals. The calculation, however, is not limited to this. The LC danger levels and the topographical risks may be calculated by the avalanche prediction system 3.

Topographical information management tables are transferred from the monitoring operation server 2 to the radio relay devices 1 and held by the radio relay devices 1. The LC danger levels and the topographical risks are updated at the predetermined intervals at which the LC danger levels and the topographical risks are calculated by the monitoring operation server 2. The topographical information management table is an example of a "storage unit".

In the example illustrated in FIG. 13, each of the LC danger levels is a value that is in a range from 1.0 to 21 on a 1.0 unit basis. Each of the topographical risks is a value that is in a range from 1.0 to 20 on a 1.0 unit basis. Details of the LC danger levels and the topographical risks are described later.

FIG. 14 illustrates an example of an LC danger level cause table. The LC danger level cause table is held by the monitoring operation server 2 and used to calculate the LC danger levels by the monitoring operation server 2.

In the LC danger level cause table, causes of the occurrence of an avalanche in an LC that dynamically change, and evaluation points for levels of the causes, are stored. The causes of the occurrence of an avalanche in the LC that dynamically change are the amounts (temperature change levels) of changes in temperature, precipitation amounts, snow accumulations, wind velocities, snow depths, changes (snow alternations) in qualities of snow due to accumulated snow, and the like.

The temperature change levels are the amounts of changes in temperature measured at predetermined intervals from previously measured temperatures. In the example illustrated in FIG. 14, averages of the amounts of changes in temperature measured at the latest one-hour intervals are used as the temperature change levels. Each of the precipitation amounts is a value obtained by dividing the volume of rain at a measurement point in a predetermined time period by the area of the measurement point and is expressed on a 0.5 millimeter basis, for example. Each of the snow accumulations is a value obtained by dividing the volume of snow at the measurement point in a predetermined time period by the area of the measurement point and is expressed on a centimeter basis.

The levels of the causes and evaluation points for the levels of the causes are set by the administrator of the radio communication network system 100. The levels of the causes and the evaluation points for the levels of the causes are not limited to those illustrated in FIG. 14.

In the embodiment, the LC danger levels are calculated by multiplying the evaluation points of the temperature change levels, the precipitation amounts, the snow accumulations, the wind velocities, the snow depths, and the snow alternations. The method of calculating the LC danger levels, however, is not limited to this.

FIG. 15 illustrates an example of a topographical risk cause table. The topographical risk cause table is held by the monitoring operation server 2. The topographical risk cause table is used to calculate the topographical risks by the monitoring operation sensor 2. In the topographical risk cause table, static causes of the occurrence of an avalanche, and evaluation points for levels of the causes, are stored. The static causes of the occurrence of an avalanche are, for example, inclinations, vegetation, and the like. The vegetation is vegetable cover within an LC or habitat states of vegetation.

The levels of the causes and the evaluation points for the levels of the causes are set by the administrator of the radio communication network system 100. The levels of the causes and the evaluation points for the levels of the causes are not limited to those illustrated in FIG. 15.

In the embodiment, the topographical risks are calculated by multiplying evaluation points of inclinations by evaluation points of vegetation. The method of calculating the topographical risks, however, is not limited to this.

Flows of Processes

Figure 16A:
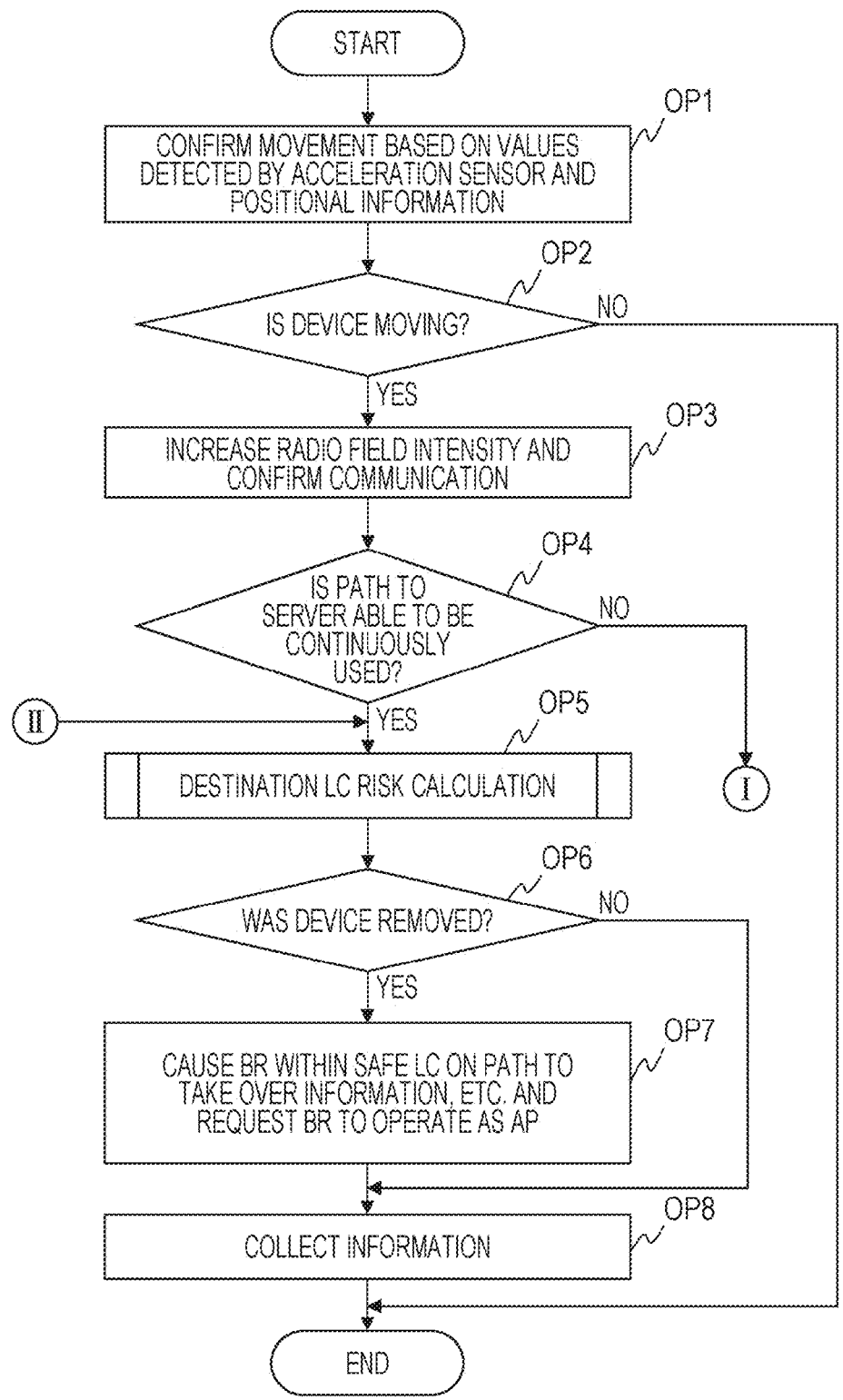
FIG. 16A illustrates an example of an operational flowchart of an avalanche support process to be executed by a radio relay device that operates as an AP, according to an embodiment.
Figure 16B:
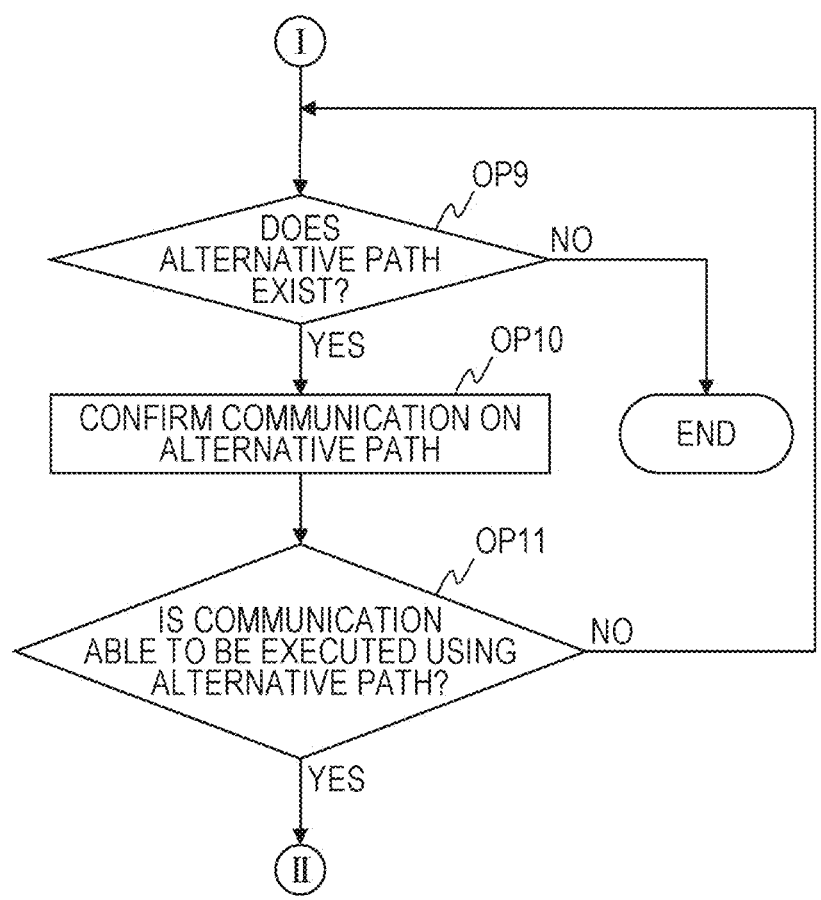
FIG. 16B illustrates an example of an operational flowchart of the avalanche support process to be executed by the radio relay device that operates as the AP, according to an embodiment.

FIGS. 16A and 16B are an example of an operational flowchart of an avalanche support process that is executed by a radio relay device 1 serving as the AP. The process illustrated in FIGS. 16A and 16B is repeatedly executed at predetermined intervals during the operation of the AP. The predetermined intervals at which the process illustrated in FIGS. 16A and 16B is repeatedly executed are, for example, in the order of milliseconds and are longer than intervals at which the acceleration sensor 17 executes sensing. Although the process illustrated in FIGS. 16A and 16B is executed by the CPU 11 executing the avalanche support program 14, the avalanche support processing unit 101 is mainly described below for convenience sake.

In OP1, the avalanche support processing unit 101 confirms a movement of the radio relay device 1 from values of gravity, vibration, and impact detected by the acceleration sensor 17 and positional information. The movement of the radio relay device 1 is comprehensively determined based on changes in the detected values of the gravity, vibration, and impact and a change in the positional information. Then, the process proceeds to OP2.

In OP2, the avalanche support processing unit 101 determines whether or not the radio relay device 1 is moving. Whether or not the radio relay device 1 is moving is determined based on whether or not at least one of the detected values of the gravity, vibration, and impact and the positional information continuously changes for a predetermined time period. When the radio relay device 1 is moving (Yes in OP2), the process proceeds to OP3. When the radio relay device 1 is not moving (No in OP2), the process illustrated in FIG. 16A is terminated.

In OP3, the avalanche support processing unit 101 increases a radio field intensity and confirms communication with the monitoring operation server 2. The radio field intensity may be increased by a predetermined level in a stepwise manner. Alternatively, the radio field intensity may be increased at once to the maximum radio field intensity of the radio relay device 1. The avalanche support processing unit 101 confirms the communication with the monitoring operation server 2 by transmitting a PING message to the monitoring operation server 2, for example. Then, the process proceeds to OP4.

In OP4, the avalanche support processing unit 101 determines whether or not a current path to the monitoring operation server 2 is able to be continuously used. In this case, the avalanche support processing unit 101 makes the determination by determining whether or not the radio relay device 1 received, from the monitoring operation server 2, a response to the PING message transmitted for the confirmation of the communication in OP3. When the path to the monitoring operation server 2 is able to be continuously used (Yes in OP4), the process proceeds to OP5. When the path to the monitoring operation server 2 is not able to be continuously used (No in OP4), the process proceeds to OP9 illustrated in FIG. 16B.

OP9 to OP11 are processes to be executed when the current path to the monitoring operation server 2 is not able to be used. In OP9, the avalanche support processing unit 101 determines whether or not an alternative path exists. The avalanche support processing unit 101 determines whether or not the alternative path exists by referencing the AP/BR path management table (illustrated in FIG. 10). When the alternative path exists (Yes in OP9), the process proceeds to OP10. When the alternative path does not exist (No in OP9), the process illustrated in FIGS. 16A and 16B is terminated. In this case, the radio relay device 1 that operates as the AP does not maintain the communication with the monitoring operation server 2, and communication of a terminal belonging to the radio relay device 1 is disconnected.

In OP10, the avalanche support processing unit 101 confirms communication on the alternative path. In this case, the avalanche support processing unit 101 confirms the communication on the alternative path by transmitting a PING message to BRs on the alternative path and the monitoring operation server 2 in order from a BR located closest to the target radio relay device 1 to the monitoring operation server 2. Then, the process proceeds to OP11.

In OP11, the avalanche support processing unit 101 determines whether or not the target radio relay device 1 is able to communicate with the monitoring operation server 2 by using the alternative path. In this case, the avalanche support processing unit 101 makes the determination by determining whether or not the radio relay device 1 has received responses to the PING message from all the BRs on the alternative path and the monitoring operation server 2, for example. When the target radio relay device 1 is able to communicate with the monitoring operation server 2 by using the alternative path (Yes in OP11), the process proceeds to OP5 illustrated in FIG. 16A. When the target radio relay device 1 is not able to communicate with the monitoring operation server 2 by using the alternative path (No in OP11), the process proceeds to OP9, and the avalanche support processing unit 101 executes the processes of OP9 to OP11 on a next alternative path indicated in the AP/BR path management table. When the next alternative path is not indicated in the AP/BR path management table (No in OP9), the process illustrated in FIGS. 16A and 16B is terminated.

In OP5, a destination LC risk calculation process is executed. The destination LC risk calculation process is a process of determining whether or not the radio relay device 1 that operates as the AP is expected to be removed from communication at a destination LC. Details of the destination LC risk calculation process are described later. When the destination LC risk calculation process is terminated, the process proceeds to OP6.

In OP6, the avalanche support processing unit 101 determines whether or not the result of the destination LC risk calculation process indicates that the target radio relay device 1 expected to be removed from the communication at the destination LC. When the target radio relay device 1 is expected to be removed from the communication (Yes in OP6), the process proceeds to OP7. When the target radio relay device 1 is not expected to be removed from the communication (No in OP6), the process proceeds to OP8.

In OP7, the avalanche support processing unit 101 transmits data included in the collected data management DB 122 to a BR located in a safe LC on the path and requests the BR to operate as the AP. The BR that received, from the AP, the request to operate as the AP changes a setting of the device from the BR to the AP, outputs a beacon signal, and starts operating as the AP so as to accumulate information of connections of terminals and execute another operation.

The avalanche support processing unit 101 assumes that BRs on the path move at the same speed as the target radio relay device 1 in the same direction as the target radio relay device 1, and the avalanche support processing unit 101 predicts destination LCs of the BRs on the path, for example. In addition, the avalanche support processing unit 101 determines, based on topographical risks and LC danger levels of the destination LCs of the BRs on the path, probabilities at which the BRs on the path are removed from communication. Then, the avalanche support processing unit 101 selects, as a BR located in a safe LC on the path, a BR that is not likely to be removed from the communication. The determination of whether or not the BRs on the path are removed from the communication corresponds to the destination LC risk calculation process described later. When multiple BRs exists in the safe LC on the path, the avalanche support processing unit 101 selects a BR located closest to the target radio relay device 1, for example. Then, the process proceeds to OP8.

In OP8, the avalanche support processing unit 101 requests the data collecting unit 121 to collect information in order to save human life. The data collecting unit 121 receives the request from the avalanche support processing unit 101, outputs a beacon signal for the detection of terminals located around the target radio relay device 1, and collects information such as MAC addresses of the terminals located around the target radio relay device 1. In addition, when the radio relay device 1 includes an olfactory sensor, the olfactory sensor may detect blood odor or the like and the data collecting unit 121 may collect information of the detected blood odor or the like. After that, the process illustrated in FIG. 16A is terminated.

Figure 17:
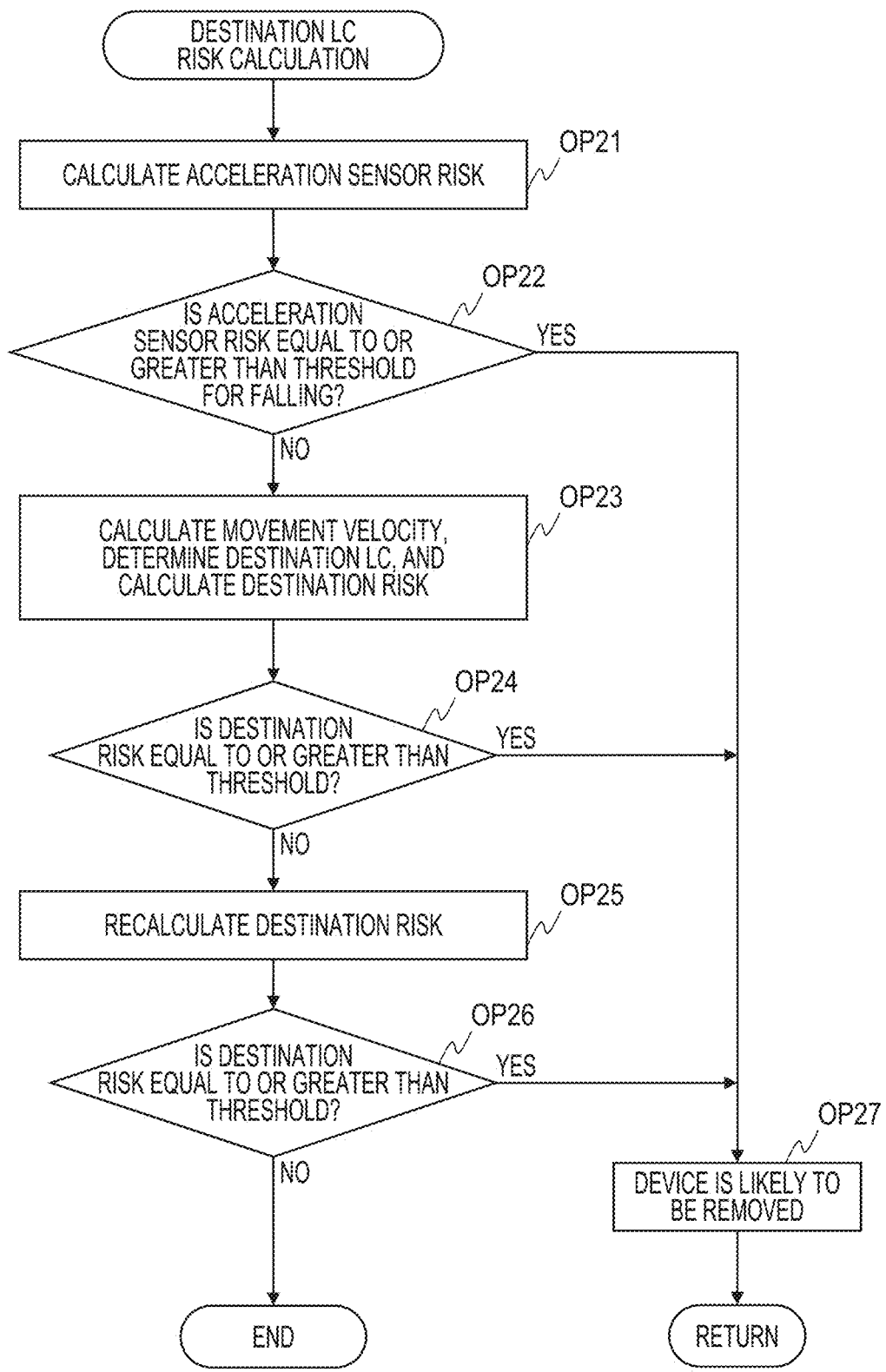
FIG. 17 illustrates an example of an operational flowchart of a destination LC risk calculation process, according to an embodiment.

FIG. 17 illustrates an example of an operational flowchart of the destination LC risk calculation process executed in OP5 illustrated in FIG. 16A. In OP21, the avalanche support processing unit 101 calculates an acceleration sensor risk based on the values of the "gravity", "vibration", and "impact" detected by the acceleration sensor 17. The acceleration sensor risk is calculated by multiplying the evaluation points of the "gravity", "vibration", and "impact" in the embodiment. Then, the process proceeds to OP22.

In OP22, the avalanche support processing unit 101 determines whether or not the acceleration sensor risk is equal to or greater than a threshold for falling. When the acceleration sensor risk is smaller than the threshold for falling (No in OP22), the process proceeds to OP23. When the acceleration sensor risk is equal to or greater than the threshold for falling (Yes in OP22), the process proceeds to OP27. In OP27, the avalanche support processing unit 101 determines that the target radio relay device 1 is likely to be removed from the communication. After that, the process proceeds to OP6 illustrated in FIG. 16A.

In OP23, the avalanche support processing unit 101 calculates a movement velocity, determines a destination LC, and calculates a destination risk. For example, the avalanche support processing unit 101 calculates the movement velocity by dividing a movement distance calculated from positional information of two points by the difference between times when the positional information of the two points is acquired. In addition, the avalanche support processing unit 101 may acquire a direction in which the target radio relay device 1 moves, from the positional information indicating the two points and used for the calculation of the movement velocity and the times when the positional information of the two points is acquired. The avalanche support processing unit 101 determines, based on the calculated movement velocity and the movement direction, the destination LC after a lapse of a predetermined time, for example. An LC in which the radio relay device 1 is positioned after one second is determined as the destination LC, for example. The destination risk is acquired from the topographical information management table as an LC danger level and topographical risk of the destination LC. Then, the process proceeds to OP24.

In OP24, the avalanche support processing unit 101 determines whether or not the calculated destination risk is equal to or greater than a destination risk threshold. For example, destination risk thresholds may be prepared for the LC danger level and the topographical risk, respectively, and the avalanche support processing unit 101 may make the determination in OP 24 by determining whether or not the LC danger level and topographical risk of the destination LC are equal to or greater than the respective destination risk thresholds, for example. In addition, the destination risk threshold may be prepared for a value obtained from a predetermined equation using, as variables, the LC danger level and topographical risk of the destination LC, and the avalanche support processing unit 101 may make the determination in OP 24 by determining whether or not the value obtained from the LC danger level and topographical risk of the destination LC and the equation is equal to or greater than the destination risk threshold.

When the destination risk is equal to or greater than the destination risk threshold (Yes in OP24), the process proceeds to OP27. In OP27, the avalanche support processing unit 101 determines that the radio relay device 1 is likely to be removed from the communication. After that, the process proceeds to OP6 illustrated in FIG. 16A. When the destination risk is smaller than the destination risk threshold (No in OP24), the process proceeds to OP25.

In OP25 and OP26, the avalanche support processing unit 101 repeatedly executes the same processes as OP23 and OP24. Specifically, in OP25, the avalanche support processing unit 101 recalculates the destination risk. In OP26, the avalanche support processing unit 101 determines whether or not the destination risk exceeds the destination risk threshold. The processes of OP25 and OP26 are executed in order to double-check the destination risk, because time passes after the processes of OP23 and OP24 and it is considered that the state of the radio relay device 1 changes.

When the destination risk is equal to or greater than the destination risk threshold (Yes in OP26), the process proceeds to OP27. In OP27, the avalanche support processing unit 101 determines that the radio relay device 1 is likely to be removed from the communication. After that, the process proceeds to OP6 illustrated in FIG. 16A. When the destination risk is smaller than the destination risk threshold (No in OP26), the avalanche support processing unit 101 determines that the radio relay device 1 is able to continuously execute the communication, and the process illustrated in FIG. 17 is terminated.

The process executed by the radio relay device 1 that operates as the AP is described above with reference to FIGS. 16A, 16B, and 17. The radio relay device 1 that operates as a BR executes the processes of OP1 to OP4 illustrated in FIG. 16A, for example. Specifically, the BR detects a movement of the radio relay device 1 from values detected by the acceleration sensor 17. When the target device 1 is moving, the BR increases a radio field intensity and confirms communication with the AP or communication with a BR adjacent to the target radio relay device. When the communication is not able to be executed, the BR increases the radio field intensity and repeatedly confirms the communication with the adjacent BR or the communication with the AP until the BR receives a response from the adjacent BR or the AP or until the radio field intensity becomes the maximum intensity.

Effects of Embodiment

In the embodiment, a first radio relay device 1 that operates as the AP determines the destination risk and requests a BR located in a safe LC to operate as the AP when the first radio relay device 1 determines that the first radio relay device 1 is likely to be removed from communication. Thus, even if the AP is removed from the communication, a second radio relay device 1 that operates as a BR newly operates as the AP, and a terminal belonging to the first radio relay device 1 is connected to the second radio relay device 1 newly operating as the AP and may continuously execute communication. Specifically, according to the embodiment, the availability of the radio communication network system may be improved.

In the embodiment, when a radio relay device 1 that operates as the AP is moving, the radio relay device 1 predicts a destination LC, calculates a destination risk of the destination LC, and determines whether or not the radio relay device 1 is likely to be removed from communication at the destination. Thus, even if the radio relay device 1 is struck by a disaster changing overtime, such as an avalanche, the radio relay device 1 may take pre-emptive measures against the disaster and reduce a possibility at which communication is disconnected.

In the embodiment, when the AP requests a BR to operate as the AP, the AP causes the BR to take over data collected by the AP. Thus, even if the AP is struck by an avalanche and fails and data is lost, the data is not erased and is saved.

In the embodiment, when the destination risk does not exceed the destination risk threshold, the radio relay device 1 recalculates the destination risk and determines whether or not the recalculated destination risk exceeds the destination risk threshold. Thus, the radio relay device 1 may accurately determine, based on a situation that changes over time, whether or not the radio relay device 1 is likely to be removed from communication.

In the embodiment, after the AP causes a BR to take over operations of the AP, the AP collects information of an area surrounding the AP. Thus, even if communication of the AP becomes disabled, as long as data stored therein is not lost, saving of human life may be supported by the collection of information accumulated in the AP.

Others

In the embodiment, as one of the communication disabling risks, the acceleration sensor risk is used. As a communication disabling risk, a value detected by a sensor included in each radio relay device 1 may be used, as well as the acceleration sensor risk. An example of the sensor included in each radio relay device 1 is an icing sensor. The icing sensor is a sensor for detecting that the radio relay device 1 is frozen. For example, a value detected by the icing sensor may be acquired in OP21 illustrated in FIG. 21 and whether or not the radio relay device 1 is frozen may be determined in OP22. The communication disabling risks may be determined based on a combination of the values detected by the acceleration sensor and the value detected by the icing sensor.

In the embodiment, when the AP determines that the AP is likely to be removed from communication, the AP causes a BR located on a path to the monitoring operation server 2 to take over a role of the AP and data collected by the AP. The embodiment, however, is not limited to this. For example, the AP may cause a radio relay device 1 located near the AP on another path to the monitoring operation server 2 to take over the role of the AP and the data collected by the AP.

The AP may cause a radio relay device 1 other than a BR located on the path to the monitoring operation server 2 to take over the role of the AP and the data collected by the AP by maintaining an IP address of the radio relay device 1 located on another path in advance. The radio relay device 1 may be an AP or a BR, the AP may cause the radio relay device 1 on the other path to take over the role of the AP regardless of whether the other radio relay device 1 operates as an AP or a BR.

Although the embodiment describes an avalanche as a natural disaster as an example, the application of the technique for suppressing an effect of the natural disaster on the radio communication network system described in the embodiment is not limited to avalanches. The technique may be applied to natural disasters such as flood, earthquakes, and debris flow by setting acceleration sensor risks, the LC danger levels, the topographical risks, and the like at values appropriate for the natural disasters.

Although the embodiment describes the assumption that the radio communication network system is built using Wi-Fi, the application of the technique described in the embodiment is not limited to the radio communication network system built using Wi-Fi. For example, the technique described in the embodiment is applicable to a radio communication network system built using any of radio communication techniques such as WiMax.

Recording Medium

A program or the like that enables a machine or device (hereinafter referred to as computer or the like) such as a computer to achieve at least any of the aforementioned functions may be stored in a computer-readable recording medium from which the computer or the like reads the program. The functions may be provided by causing the computer or the like to read and execute the program stored in the recording medium.

The computer-readable recording medium is a non-transitory recording medium that electrically, magnetically, optically, mechanically, or chemically accumulates information such as data and programs and from which the data and the programs are read by the computer or the like. Examples of the recording medium that are detachable from the computer or the like are a flexible disk, a magneto-optical disc, a CD-ROM, a CD-R/W, a DVD, a Blu-ray disc, a DAT, a 8 mm tape, and a memory card such as a flash memory. Examples of the recording medium that are fixed in the computer or the like are a hard disk and a read only memory (ROM). As an example of the recording medium that is detachable from the computer or the like or fixed in the computer or the like, a solid state drive (SSD) may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
  a sensor configured to detect a predetermined physical amount indicating movement of the apparatus;
  a memory configured to store information on regions within a range including at least a path from the apparatus to the network; and
  a processor coupled to the memory and configured to:
    relay communication between a network and a terminal,
    calculate a first communication disabling risk based on the detected predetermined physical amount, and
    notify another apparatus of takeover of a process of relaying the communication between the network and the terminal when the first communication disabling risk is equal to or greater than a first threshold, wherein:
  the sensor is an acceleration sensor; and
  the processor is further configured to:
    acquire positional information indicating a current location of the apparatus,
    determine, based on the detected predetermined physical amount, whether the apparatus is moving, and
    perform a takeover process when the apparatus is moving, the takeover process including:
      predicting a destination region into which the apparatus is expected to move, based on a change in the positional information,
      calculating a second communication disabling risk, based on information on the destination region, and
      notifying the another apparatus of the takeover when the second communication disabling risk is equal to or greater than a second threshold.

2. The apparatus of claim 1, wherein
the processor is configured to:
  predict a destination region into which the another apparatus positioned on the path is expected to move, based on change in the positional information of the apparatus,
  calculate a communication disabling risk of the another apparatus, based on information on the destination region, and
  notify the another apparatus of the takeover when the communication disabling risk of the another apparatus is smaller than the predetermined threshold.

3. The apparatus of claim 1, wherein
when the second communication disabling risk is smaller than the second threshold, the processor recalculates the second communication disabling risk and determines whether the recalculated second communication disabling risk is equal to or greater than the second threshold.

4. The apparatus of claim 1, wherein
upon detecting that the apparatus is moving, based on the predetermined physical amount, the processor increases an output voltage of a radio wave by a predetermined amount and transmits a communication acknowledgement message to a predetermined destination.

5. A system comprising:
  a first radio communication device including a first processor configured to relay communication between a network and a terminal; and
  a second radio communication device including a second processor configured to relay communication between the first radio communication device and the network, wherein
  the first radio communication device includes:
    a sensor configured to detect a predetermined physical amount indicating movement of the first radio communication device, and a memory configured to store information on regions within a range including at least a path from the first radio communication device to the network;

the first processor of the first radio communication device is configured to
- calculate a first communication disabling risk based on the predetermined physical amount and
- notify the second radio communication device of notification indicating takeover of a process of relaying the communication between the network and the terminal when the first communication disabling risk is equal to or greater than a first threshold; and the second processor of the second radio communication is configured to start a process of relaying communication between the network and the terminal when the second radio communication device receives the notification from the first radio communication device, wherein:

the sensor is an acceleration sensor; and the first processor of the first radio communication device is further configured to:
- acquire positional information indicating a current location of the first radio communication device,
- determine, based on the detected predetermined physical amount, whether the first radio communication device is moving, and
- perform a takeover process when the first radio communication device is moving, the takeover process including:
  - predicting a destination region into which the first radio communication device is expected to move, based on a change in the positional information,
  - calculating a second communication disabling risk, based on information on the destination region, and
  - notifying the second radio communication device of the takeover when the second communication disabling risk is equal to or greater than a second threshold.

6. A method comprising:

causing a radio communication device configured to relay communication between a network and a terminal to acquire a predetermined physical amount from a sensor, the predetermined physical amount indicating movement of the radio communication device; and causing the radio communication device to calculate a first communication disabling risk based on the predetermined physical amount and notify another radio communication device of takeover of a process of relaying the communication between the network and the terminal when the first communication disabling risk is equal to or greater than a first threshold, wherein:

the sensor is an acceleration sensor; and the method further comprises causing the radio communication device to:
- acquire positional information indicating a current location of the radio communication device,
- determine, based on the detected predetermined physical amount, whether the radio communication device is moving, and
- perform a takeover process when the radio communication device is moving, the takeover process including:
  - predicting a destination region into which the radio communication device is expected to move, based on a change in the positional information,
  - calculating a second communication disabling risk, based on information on the destination region, and
  - notifying the another radio communication device of the takeover when the second communication disabling risk is equal to or greater than a second threshold.

7. A non-transitory, computer-readable recording medium having stored therein a program for causing a computer to execute a process comprising:

causing a radio communication device configured to relay communication between a network and a terminal to acquire a predetermined physical amount from a sensor, the predetermined physical amount indicating movement of the radio communication device; and causing the radio communication device to calculate a first communication disabling risk based on the predetermined physical amount and notify another radio communication device of takeover of a process of relaying the communication between the network and the terminal when the first communication disabling risk is equal to or greater than a first threshold, wherein:

the sensor is an acceleration sensor; and the process further comprises causing the radio communication device to:
- acquire positional information indicating a current location of the radio communication device,
- determine, based on the detected predetermined physical amount, whether the radio communication device is moving, and
- perform a takeover process when the radio communication device is moving, the takeover process including:
  - predicting a destination region into which the radio communication device is expected to move, based on a change in the positional information,
  - calculating a second communication disabling risk based on information on the destination region, and
  - notifying the another radio communication device of the takeover when the second communication disabling risk is equal to or greater than a second threshold.

* * * * *